United States Patent [19]

Smith

[11] Patent Number: 4,460,155
[45] Date of Patent: Jul. 17, 1984

[54] TANK DISCHARGE VALVE WITH PRESSURE ASSISTED SEAT

[75] Inventor: Russell G. Smith, Cincinnati, Ohio

[73] Assignee: Xomox Corporation, Cincinnati, Ohio

[21] Appl. No.: 323,888

[22] Filed: Nov. 23, 1981

Related U.S. Application Data

[63] Continuation of Ser. No. 69,745, Aug. 27, 1979.

[51] Int. Cl.³ .............................................. F16K 51/00
[52] U.S. Cl. .................................... 251/144; 251/175; 251/188; 251/312
[58] Field of Search ............... 251/309, 312, 144, 175, 251/188, 192

[56] References Cited

U.S. PATENT DOCUMENTS

| 1,526,890 | 2/1925 | Wilson | 251/144 |
| 1,570,637 | 1/1926 | Nordstrom | 251/144 |
| 2,191,815 | 2/1940 | Clade | 251/144 |
| 2,987,295 | 6/1961 | Schenk et al. | 251/312 |
| 3,662,986 | 5/1972 | Domulewicz, Sr. | 251/144 |
| 3,703,910 | 11/1972 | Smith | 251/309 |
| 3,882,884 | 5/1975 | Leopold, Jr. et al. | 251/309 |
| 4,187,881 | 2/1980 | Kull | 251/144 |

Primary Examiner—A. Michael Chambers
Attorney, Agent, or Firm—Kinney and Schenk

[57] ABSTRACT

A plug valve for controlling discharge of a fluid tank has an upper surface continuously subjected to the weight and pressure of the tank's contents. Pressure applied to this upper surface is transmitted through the valve to assist sealing with a member subjacent to the valve's plug.

5 Claims, 5 Drawing Figures

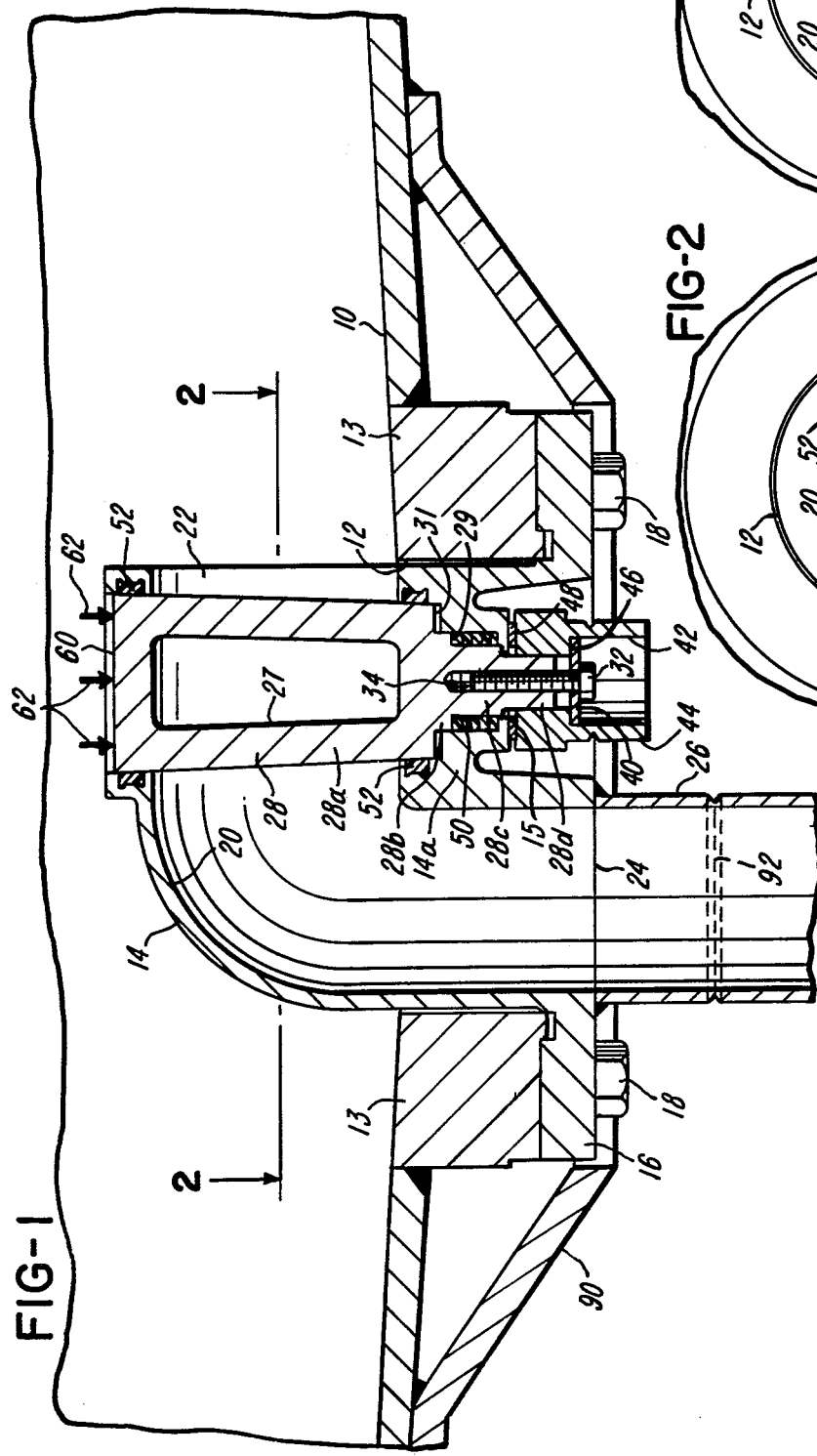
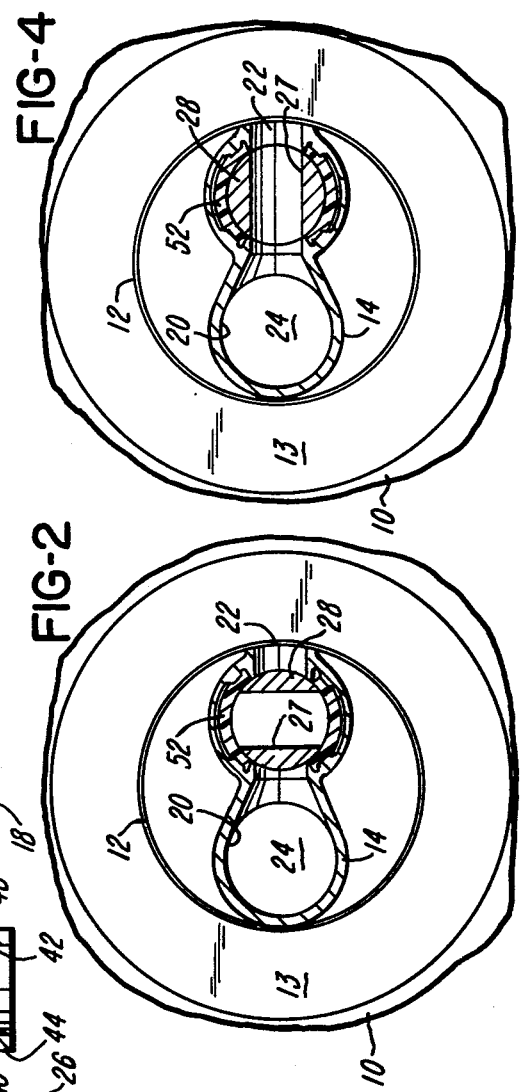

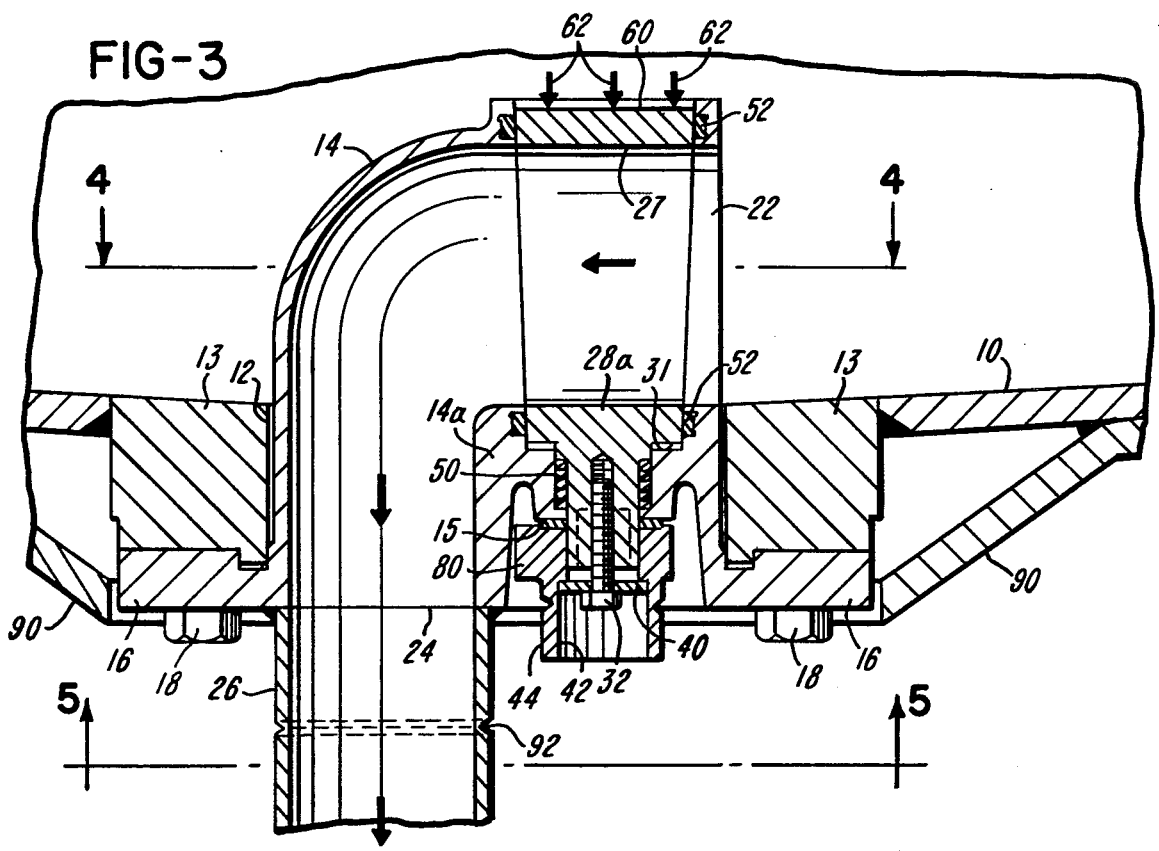
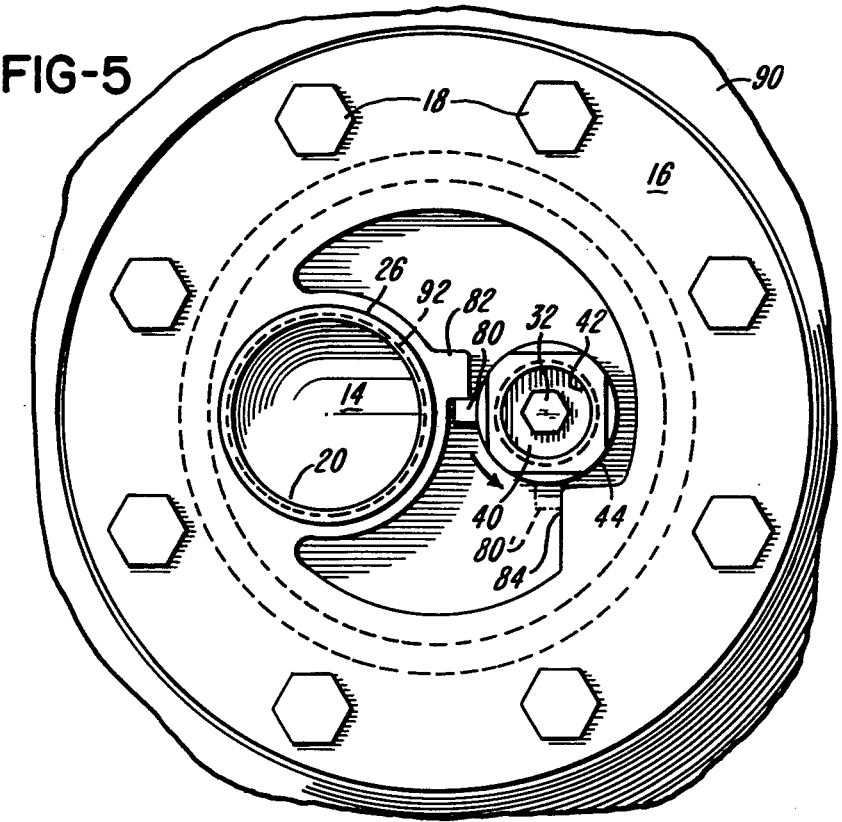

TANK DISCHARGE VALVE WITH PRESSURE ASSISTED SEAT

This application is a continuation of application Ser. No. 069,745, filed Aug. 27, 1979.

BACKGROUND

The present invention relates to tank discharge valves and more particularly to a discharge valve with a pressure assisted seal. The valve of the present invention has utility for any type of container with a valved discharge opening. It will, however, be disclosed, by way of example, in connection with a discharge valve on a railroad tank car.

In the past, it was customary to provide discharge valves interiorly of a railroad tank car which were secured to the bottom of the tank and activated by means of a rod which extended upwardly through the tank car and terminated in a hand wheel accessible from top of a tank car. This remote placement of the activating means had obvious disadvantages and more recently tank discharge valves have been placed beneath the bottom surface of the tank and protected by a downwardly pending collar-like skid which is welded to the undersurface of the bottom wall of the tank car and which thus protects the projecting valve from damage caused by impact with obstructions in the path of the car or from impact resulting from derailments.

When valves are placed beneath the bottom surface of the tank, the skids which are designed to protect these valves must extend downwardly a foot or more. By reason of their size, the downwardly projecting skids themselves become susceptible to being knocked off a tank car bottom upon impact with resultant damage to the valve.

Reducing the profile of the valves and protective skids beneath the tank car significantly reduces the likelihood that either of these elements will come into contact with obstructions in the car's path. This approach has been followed by several designers in the field with partially successful results. The most successful of these attempts have placed the discharge valve interiorly of the tank.

In addition to preventing the discharge valve from being knocked off during impact, it is obviously also desirable to prevent the valve from leaking. This last mentioned goal becomes critical whenever the container contents are toxic or otherwise dangerous. Due to an increase in the resulting hydrostatic pressure, the likelihood of discharge valve leakage increases with the heighth of the fluid level in the tank. Past attempts to provide satisfactory discharge valves have not addressed this important problem.

It is therefore an object of the present invention to provide a pressure assisted seat in a tank discharge valve which will automatically compensate for increases in the fluid pressure.

It is a further object of the present invention to provide a valve with a pressure assisted seat which is interiorly disposed within a tank and which has a relatively low profile projecting the tank.

It is a further object of the present invention to provide a discharge valve with a pressure assisted seat which has an increased discharge rate.

SUMMARY OF THE INVENTION

In accordance to the invention, a plug valve with a pressure assisted seat is interiorly disposed within a fluid tank and is secured to an opening therein. The valve includes a valve body with a valve plug rotatably fitted within the body. This valve is operative to control fluid flow through the opening in the tank in accordance to its position relative to the valve opening. The valve plug has an upper surface which is continuously subjected to the weight and pressure of the tank contents. This pressure is transmitted through the valve plug to assist in sealingly interfacing a lower surface of the valve plug with a sealing member positioned subjacent to the valve plug. The sealing pressure between the lower valve plug surface and the sealing member is thus dependent upon the weight and pressure of the tank contents applied to the upper valve plug surface. The valve also includes means for establishing sealing pressure between the valve plug and the sealing member independent of the pressure of the tank contents which serves to maintain the sealing relationship prior to filling the tank and subsequent to discharging.

BRIEF DESCRIPTION OF THE DRAWINGS

Other objects and advantages of the invention will be apparent upon reading the detailed description and upon reference to the drawings in which:

FIG. 1 is a cross sectional elevational view of a bottom portion of a railroad tank car depicting one form of the present invention secured to an opening in the tank.

FIG. 2 is a cross sectional view of the valve of FIG. 1 taken along line 2—2 in FIG. 1 depicting the valve in a closed position.

FIG. 3 is a cross sectional view of the valve of FIG. 1 but showing the valve in an open position.

FIG. 4 is a view similar to the illustration of FIG. 2 but showing the valve in an open position.

FIG. 5 is a bottom view of the valve opening of FIG. 3 taken along 5—5.

While the invention will be disclosed in connection with a preferred embodiment, it will be understood that it is not intended to limit the invention to that embodiment. On the contrary, it is intended to cover all alternatives, modifications and its equivalents as may be included within the spirit and scope of the invention as defined by the appended claims.

DETAILED DESCRIPTION OF THE INVENTION

Referring now to the drawings and to FIG. 1 in particular, a bottom portion 10 of a railroad tank car is shown in the vicinity of an opening 12 in the tank bottom 10. The illustrated tank bottom has the standard flange 13 forming a saddle which is standard in commercially available tank cars. A valve housing 14 has flange 16 which is secured to the saddle or tank flange 13 by suitable fastening means as for example, bolts 18. The valve housing 14 has a flow passage 20 which extends from a valve inlet port 22 to a valve outlet port 24. A discharge pipe 26 is welded to the valve outlet port 24 to receive fluid discharge therefrom.

A valve plug 28 having a central opening 27 is rotatably fitted within the valve housing 14 to control fluid flow therethrough. It is movable between an open position in which the opening 27 is aligned with the central bore 20 and a closed position in which the opening 27 does not align or register with the central bore 20. This rotatable movement of the valve plug 28 serves to selectively establish fluid communication between the valve inlet port 22 and a valve outlet port 24. The valve plug 28 has a main tapered portion 28a which extends from a top portion of the valve housing 14 across the central bore or flow channel 20 to a lower end of the valve housing 14. This main section of the valve plug 28 is tapered with the cross sectional area of the valve plug 28a continuously decreasing from the top to the bottom. The lower portion of valve plug 28 consists of three distinct sections 28b, 28c, and 28d of increasingly reduced cross sectional area, and these three sections are separated by respective shoulders, 31, 29, and 15.

The valve plug 28 is secured to a lower portion 14a of the valve housing 14 by means of a bolt 32. The bolt 32 is threadably received by an open ended bore 34 which extends through section 28d and into section 28c. The head of bolt 32 engages a washer 40. The washer 40 is disposed within a bore 42 of an operating hub 44 and engages a shoulder 46 on that hub 44. As the bolt 32 is rotated and advanced upwardly toward the valve body 14, the operating hub 44 is carried therewith to engage a thrust washer 48 which is positioned between the operating hub 42 and the valve body 14 to provide a bearing surface between these two members and to avoid metal to metal contact.

Surrounding the intermediate section 28c of valve plug 28 is an external packing seal 50 which serves as a pressure seat for the plug 28. This packing 50 is disposed between shoulders 29 and 15 on the valve plug 28 and valve body 14 respectively and is subjacent to the portion 28b of the valve plug. A circumferential internal sealing member 52 in the form of a liner or sleeve, preferably of fluorocarbon, as for example, TEFLON, conforms to the tapered profile of the valve plug 28 as is shown in U.S. Pat. No. 3,263,697 to Reed and Smith.

As seen in FIGS. 1–3, valve plug 28 has an upper surface 60 which is continuously exposed to the contents of the tank and subjected to the weight and pressure thereof. Consequently, when the tank is full, the contents exert a force on the valve plug in the direction of arrows 62 and this force is transmitted through the valve plug 28 to compress the seat 50 subjacent to the shoulder 31. As the plug 28 is forced in the direction of arrows 62, the tapered plug 28 is wedged tighter into sealing relationship with the sealing sleeve 52. The force exerted on the upper surface 60 of the valve plug 28 increases with the heighth of the fluid contents in the tank and assists the seat 50 in maintaining a sealing relationship with the valve plug.

FIGS. 1 and 2 depict the relative positions of the valve plug 28 and valve body 14 of the illustrated embodiment in a closed position. When it is desired to discharge fluid from the tank, an operator fastens a wrench to flats, which are machined on the operating hub 42, in order to rotate the valve plug 28 and to align the opening therein with the bore 20 in the valve housing. This rotation changes the relative positions of valve plug 28 with respect to the valve body 14 to those depicted in FIGS. 3 and 4.

As shown in FIG. 3 and even more clearly in FIG. 5, the hub 42 has a tab 80 which cooperates with stops 82 and 84 which limit the rotational movement permitted by the hub 42, which in turn limits the rotation of valve plug 28. The tab 80 is shown abutting stop 82 in FIG. 5 in solid lines depicting an open position of the valve. The position of the tab is shown in a closed position abutting stop 84 in phantom lines 80'.

As readily appreciated by those skilled in the art, the threaded member 32 serves as an independent means to initially establish sufficient pressure between the valve plug 28 and the packing seal 50 and to maintain the seal whenever the fluid level in the tank falls near or below the valve top 60. The seal between these two elements is augmented and assisted by the pressure exerted upon upper surface 60 of the valve plug 28.

The plug valve used in the present invention is particularly advantageous for use as a tank discharge valve because it permits the use of the fluid pressure to assist in the seal. Further, a plug type valve is advantageous over other types of well known valves for this type of application. For example, a plug valve permits greater flow than a ball valve which has a round opening. In a plug valve, the opening may be elongated to permit approximately twice the flow rate of a ball valve. A plug type valve is also advantageous over a butterfly valve in this application in that the disc of a butterfly valve is in the flow path of the discharge fluid. Further, a butterfly valve tends to open very readily and is susceptible of trapping particulate suspensions in the liquid and trapping these suspensions between the disc and the seat upon closure, thereby scoring the seat. In a plug type valve the seals are not exposed to the direct flow, and the possibility of scoring the seat in this manner is greatly reduced.

As seen in the drawings and FIGS. 1 and 3 in particular, the plug valve of the present invention is interiorily disposed in the tank with only the valve's actuator means positioned beneath the tank bottom. Thus, a very low profile may be maintained to reduce the likelihood of impacting an obstruction in the car's path. In order to completely protect the device, however, a low profile skid 90 is fastened to the tank bottom 10 in a manner well known to those in the art. Further, the discharge pipe 26 has a circular break-off notch 92 which provides a preferred location for breakage in the event of impact with an obstacle, an event whose probability has been greatly reduced.

Since the valve is interiorily disposed within the tank, it would maintain its sealing relationship even in the event that all of the structure beneath the tank was sheared as a result of impact. In order to break the valve's seal, the entire saddle flange 12 would have to break off; and this flange is most rigidly constructed to the tank.

Thus, it is apparent that there has been provided, in accordance with the invention, a tank discharge valve that fully satisfies the objects, aims, and advantages set forth above. While the invention has been described in conjunction with a specific embodiment thereof, it is evident that many alterations, modifications, and variations will be apparent to those skilled in the art in light of the foregoing description. Accordingly, it is intended to embrace all such alternatives, modifications, and variations as fall within the spirit and scope of the appended claims.

What is claimed is:

1. In a fluid tank, the combination comprising:
   a valve body disposed substantially interiorly of the tank and secured to an opening therein;
   a valve plug rotatably fitted with said valve body and being operative to control fluid flow through the opening in the tank in accordance to its position relative to the valve body, said valve plug having an upper surface continuously, directly subjected to the weight and pressure of the tank contents;

a packing member subjecent to a lower surface of the valve plug which compresses in response to weight of the tank contents and sealingly interfaces with the valve plug with a sealing pressure which is dependent upon the weight and pressure of the tank contents applied to said upper surface of said plug valve; and means for establishing sealing pressure between said valve plug and said sealing member independent of pressure applied to said upper surface.

2. A combination as recited in claim 1 wherein said upper surface of said valve plug has an area greater than said lower surface with a continuously decreasing taper from top to bottom.

3. A combination as recited in claim 1 wherein said initial sealing means includes a threaded member which selectively moves the valve plug relative to the valve body to sealingly interface the sealing member disposed therebetween with the valve plug.

4. A combination as recited in claim 1 wherein the packing member is resilient and resiliently engages the valve plug in sealing relationship.

5. A tank car valve, said valve comprising;

a valve body, said body being substantially disposed within the interior of said tank car, said body being secured to an opening in the bottom of said tank car;

a plug valve, said valve being rotatably fitted within said valve body, said valve controlling the fluid flow through said opening in said bottom of said tank car, said valve having an upper surface, said upper surface being continuously directly exposed to the pressure of said tank car contents during all operational modes;

means for sealing said valve, said means being located subjecent to the lower surface of said valve, said means being compressingly responsive to said pressure of said tank car contents, said compressingly response being dependent upon the pressure which said tank car contents apply at any given time to said upper surface of said valve;

and means for compressing said means for sealing said valve, said means being independent of said pressure of said tank car contents, said means for compressing said means for sealing said valve being operatively connected to said bottom surface of said valve.

* * * * *